United States Patent [19]

Duran et al.

[11] Patent Number: 4,893,326
[45] Date of Patent: Jan. 9, 1990

[54] VIDEO-TELEPHONE COMMUNICATIONS SYSTEM

[75] Inventors: Joe W. Duran, Austin; Michael L. Kenoyer; Edward H. Cooper, Jr., both of San Antonio; JoonYoul Maeng, Austin, all of Tex.

[73] Assignee: Video Telecom Corp., Austin, Tex.

[21] Appl. No.: 46,248

[22] Filed: May 4, 1987

[51] Int. Cl.$^4$ ............................................. H04N 1/42
[52] U.S. Cl. ...................................... 379/53; 379/96; 455/5; 358/85
[58] Field of Search ...................... 358/85, 86; 379/53, 379/54, 96; 370/30, 69.1, 57, 124; 455/5

[56] References Cited

U.S. PATENT DOCUMENTS

| | | | |
|---|---|---|---|
| Re. 31,639 | 7/1984 | Nicholson | 455/5 |
| 3,584,142 | 6/1971 | Schoeffler | 379/53 |
| 3,678,207 | 7/1972 | Schon | |
| 3,775,563 | 11/1973 | Klein | |
| 4,287,567 | 9/1981 | Lumsden | |
| 4,386,365 | 5/1983 | Gargini | |
| 4,518,989 | 5/1986 | Yabiki et al. | |
| 4,523,055 | 6/1985 | Hohl et al. | |
| 4,581,484 | 4/1986 | Bendig | |
| 4,581,735 | 4/1986 | Flamm et al. | |
| 4,587,651 | 5/1986 | Nelson et al. | |
| 4,612,634 | 9/1986 | Bellamy | |
| 4,653,086 | 3/1987 | Laube | 379/96 |
| 4,656,654 | 4/1987 | Dumas | 379/96 |
| 4,686,698 | 8/1987 | Tompkins et al. | 358/85 |
| 4,691,340 | 9/1987 | Maeda et al. | 379/96 |

OTHER PUBLICATIONS

IBM Technical Reference, "Options and Adaptors", vol. 2, Apr. 1984, pp. 17-20.
James W. Cronin, "Dial-up Video Speeds Business Decisions", Telephony, vol. 210, No. 13, Mar. 1986, pp. 32-33.
Peter C. Lowten, "The Potential for Video Teleconferencing Utilizing A VSAT System", Teleconference, vol. 6, No. 2, Mar. 1987, pp. 2-6.
Neil S. Dumas, "Adding Color Graphics to Telephone Conferences", Army R,D & A, vol. 24, No. 5, Sep.-Oct. 1983, pp. 30-31.
Rolf Evers et al., "An Experimental Interactive Cable TV System", 1980 International Conference on Communications, Jun. 1980, pp. 54.2.1 ∝ 5.

Primary Examiner—Jin F. Ng
Assistant Examiner—David H. Kim
Attorney, Agent, or Firm—Rockey and Rifkin

[57] ABSTRACT

An auxiliary unit is used in conjunction with a personal computer based work station for interconnecting the work station to an audio-visual communications network. The auxiliary unit includes a CRT, a camera, a speaker phone circuit, and a CPU for interfacing these elements with each other and with the communications network to permit the transmission and reception of voice, video and computer graphics information.

13 Claims, 11 Drawing Sheets

FIG. 5 DUAL CABLE

FIG. 10A
PART 2

FIG. 10B

WORKSTATION'S PC MECHANISM FOR "VIDEO FOLLOWS VOICE"

FIG. 10C

SPEAKERPHONE TALKING/LISTENING SIGNAL RECEIVED FROM AUX BOX CPU

↓

IS THE WORKSTATION IN A CONFERENCE CALL WITH AT LEAST TWO OTHER VIDEO WORKSTATIONS ?

- NO → DONE UNTIL NEXT MESSAGE FROM THE AUX CPU
- YES → PC SEND THE SPEAKERPHONE DIRECTION CHANGE MESSAGE TO THE NETWORK CONTROL COMPUTER

FIG. 10D

WORKSTATION RECEIVES AUTOMATIC VIEW SELECTION MESSAGE FROM NETWORK CONTROL COMPUTER

↓

IS THE NEW VIDEO SELECTION INDEX THE SAME AS THE CURRENT AUTOMATIC SELECTION INDEX?

- YES → DONE UNTIL NEXT AUTOMATIC VIEW SELECTION MESSAGE FROM NCC
- NO → SET THE AUTOMATIC SELECTION INDEX TO THE NEW VIDEO SELECTION INDEX

↓

IS THE WORKSTATION IN AUTOMATIC PICTURE SELECTION MODE, AND CURRENTLY VIEWING VIDEO?

- NO → DONE UNTIL NEXT AUTOMATIC VIEW SELECTION MESSAGE FROM NCC
- YES → TUNE TO THE NEWLY SELECTED PICTURE AND DISPLAY IT

VIDEO-TELEPHONE COMMUNICATIONS SYSTEM

BACKGROUND OF THE INVENTION

This invention relates to the transmission of voice, video and graphics information between two or more work stations utilizing either local area networks or long distance transmission systems. More specifically, it relates to a video telephone communication system capable of transmitting real time video images, computer generated graphics and audio information between a plurality of work stations or terminals which may be interconnected by means of a local area network or, for example, the existing telephone communications network. The system is intended for desk top use in connection with a standard telephone set and a personal computer. The system is easily installed and does not interfere with normal use of either the telephone set or the personal computer. When called upon, however, it will automatically dial a phone number, establish a corresponding video communication channel and provide a number of advantageous features not heretofore possible in a system of the type to be described.

Specifically, the advantages of the present invention include, but are not limited to: improved methods of transferring personal computer graphics and data from one work station to another to permit the receiving work station's personal computer to share and manipulate the graphics and data; the provision of circuitry which allows the convenient display of both computer graphics or data and a TV picture on the same monitor; the provision of circuitry for determining which picture, in a multi-work station conference, is displayed as a function of the voice information (video-follows-voice).

The present invention is designed to work with most PBX systems, with telephone company Centrex systems and other communication systems.

The benefits of the present invention are obtained from combining three distinct technologies:

1. Voice calling and conferencing utilizing the audio communications structure of an existing telephone system. All calling features available to an analog telephone can be used with the invention.

2. Graphic conferencing uses the personal computer as a data conference terminal. Any or all members of the conference call can present material on their PC screens. This information can also be sent to all meeting participants through the video network. All participants view the data screen in full color, even if they do not share the same application software.

3. Video technology provides callers with broadcast quality video images in full-motion color. A single computerized central point in the system controls multiple, simultaneous but separate, calls over the network. The number of participants in any one conference call is limited only by the conference bridge of the existing voice communications system.

During a video call each person controls the full range of features for his or her work station by a hand-held infrared remote control. Calls can be initiated by dialing with either the remote control or a regular telephone instrument. All video features are activiated by pressing a key on the remote control.

A hands-free speaker phone built into the camera housing allows for comfortable communication. Video switching is voice activated and automatic. The screen automatically shows the current speaker unless manual video switching is selected.

Prior efforts to transmit both voice and video have been only partially successful. In some instances these systems are dedicated, not suitable for random calling and access. Use of the equipment must be scheduled and then participants must plan around the availability of the equipment. Other systems require very expensive circuitry and do not have the capability of the present invention for interfacing with a personal computer which is now commonly employed by engineers, executives and the like in their daily operations to manage information.

By contrast, the present invention is intended for wide spread use by companies having personnel who need to communicate with each other, both by voice channel and to share video information which may be either computer data or live video pictures of the persons speaking.

SUMMARY OF THE INVENTION

The present invention is a series of circuit modules which are interconnected with an existing telephone set and a personal computer to create a work station. The work station's video information is networked either locally or through a telephone system under the control of a network control computer (NCC) and cable distribution unit (CDU). The NCC is merely another work station dedicated to the purpose of directing traffic between the remaining work stations.

At each work station there is an auxiliary box, a video camera, and a CRT. These elements are interfaced to the telephone system and the personal computer to create the work station. The aux box includes a speaker phone circuit permitting hands free conversations and the signals necessary to produce the video-follows-voice function. In addition, the aux box includes a modulator for the video camera, a tuner/demodulator for the CRT display, and a CPU which interfaces with the remote control and which controls the various elements of the aux box to perform the desired functions.

DETAILED DESCRIPTION

Figure 1:
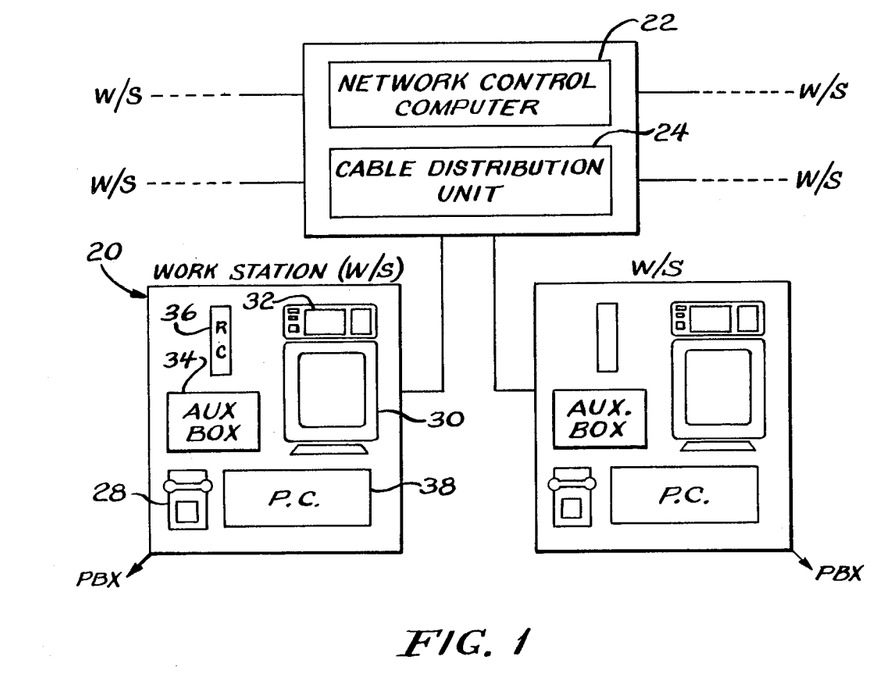
FIG. 1 is a block diagram useful in understanding the environment for which the present invention is intended.

Referring to the drawings and, in particular, FIG. 1, the invention is shown in block form. The invention includes a number of work stations, such as station 20, interconnected via a network control computer (NCC) 22 and a cable distribution unit (CDU) 24. In FIG. 1 two work stations are shown but a number of additional work stations are indicated by the dashed lines. A plurality of such work stations are networked through the network control computer 22 and, for example, in a preferred embodiment of the system, up to eleven simultaneous conversations (audio, video and computer data) may be carried on by the system. The work stations are connected to the CDU by any of several schemes. For example, the video portion of a local network may use coaxial cable interconnections of up to approximately three miles. Such an arrangement would be suitable where the work stations are all contained within a campus or closely located buildings. Alternatively, the system can interconnect work stations at a plurality of locations using serial transmission of video information over dedicated lines through the use of a codec device. Such a device, as is known in the art, performs data compression suitable for transmitting video over long distance transmission lines. Another alternative is the use of fiber optic cables which, of course, have greater range and capability than coaxial cable.

Regardless of how the work stations are interconnected to the CDU, the stations include a telephone set represented at 28, a video monitor or CRT 30, a video camera 32, preferably positioned on top of the CRT and directed at the person who will use the work station. The work station further includes an aux box 34 containing a number of electric circuits described in FIG. 2 and a hand held remote control unit 36 of the type commonly employed with home television receivers. In this case, however, the remote control permits remote dialing, switching of the information to be viewed on the CRT, access to a personal computer, such as computer 38.

Figure 2:
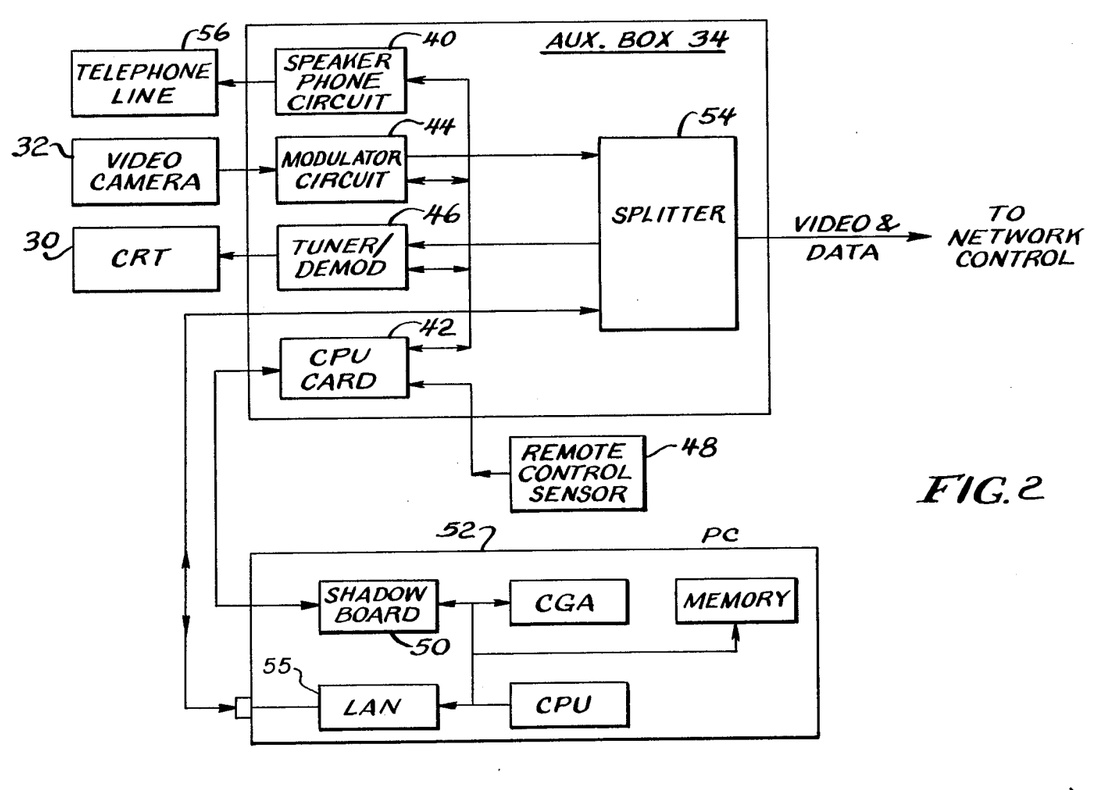
FIG. 2 is a block diagram of a typical work station.

Referring to FIG. 2, a block diagram of the work station 20 of FIG. 1 is illustrated. As indicated, the aux box 34 includes a speaker phone circuit 40 which interfaces with the telephone line under control of a CPU 42. The CPU may be of any suitable type commercially available as, for example, the CPU manufactured by Intel Corporation under the designation 8031.

Also controlled by the CPU 42 is an RF modulator circuit 44 for modulating the video signal from the camera 32, and a tuner/demodulator circuit 46 for supplying video information to the CRT 30. Two additional circuits which communicate with the CPU 42 are the remote control sensing circuit 48 and a shadow board 50 which is added to the "slots" of a typical personal computer (PC) 52 in FIG. 2. As will be described in connection with FIG. 9, the shadow board monitors the graphics card of the PC to permit access to certain display information which is not otherwise available, which information is necessary in order to accomplish the objectives of the present invention.

Summarizing the FIG. 2 arrangement, the aux box 34 includes a CPU card 42 which controls the operation of a speaker phone, modulator and tuner/demodulator circuit responsive to inputs form the user via the remote control. Data can be sent to other work stations by the PC via the aux box splitter and can be received from other work stations via splitter 54 which is connected to the CDU unit 24 of the network control computer. Thus, when desired, the work station can cause computer generated data and/or graphics to be sent to other work stations, or it can send video information from the camera 32. In addition, it can receive video images and display them on the CRT 30 or receive data and provide it to the personal computer 52. Thus, the interconnection of the splitter 54 with the network control computer and CDU permits the transmission and reception of video and computer data with other work stations. Similarly, the speaker phone circuit 40 and the telephone line indicated at 56 permits transmission of voice and data.

Operation of the system will be described in detail subsequently. It will be useful here, however, to describe the manner in which a call is initiated by the system of FIG. 2. The first user dials (via the remote control or manually) a telephone number or local area extension. The sensor 48 picks up the coded information and supplies it to the CPU 42. The CPU enables the speaker phone circuit 40 for the purpose of dialing the selected phone number or extension on the telephone line 56. Simultaneously the CPU causes the PC to contact the NCC and CDU unit via the LAN card 55 and the splitter 54. The NCC assigns transmission and reception frequencies to each work station involved in the call. Ultimately this enables graphics, computer data and/or video information from the camera 32 to be sent to and from the other work stations.

The data sent over the network is used by the network control computer for several purposes including: allocation of frequencies for video communications (described in connection with FIGS. 3 and 4), alerting the work station being dialed that it is about to receive video and audio communications.

Figure 3:
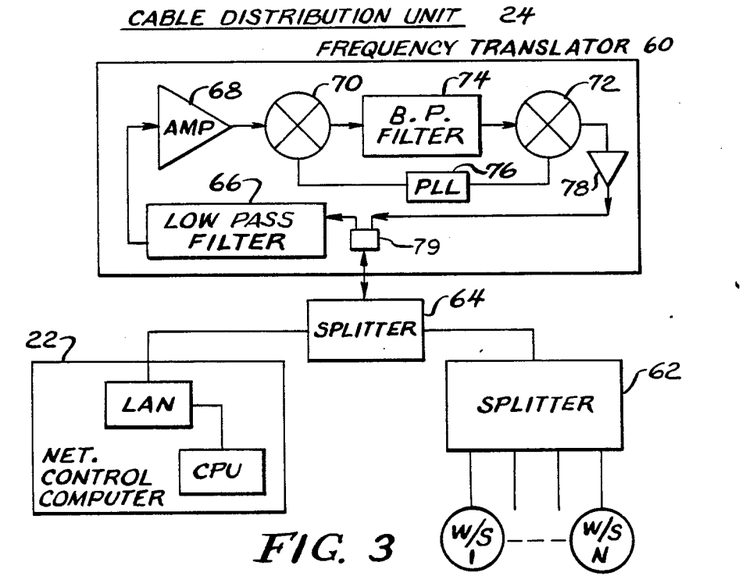
FIG. 3 is a block diagram of the frequency translator contained in the cable distribution unit (CDU) associated with the network control computer (NCC).

Referring to FIG. 3, the principal elements of the CDU 24 are illustrated. The CDU interfaces the network control computer 22 with the various work stations via splitters appropriate for the type of cable communications employed. In addition, the CDU includes a frequency translator 60 which serves to upshift the frequency of the video signals by a selected amount. The upshifted frequency is then placed back on the cable system for transmission to each selected work station. As indicated, the NCC oversees the operation of the frequency translator 60 to assign the transmission and receiving frequencies. The control computer may be an IBM PC or compatible unit with a local area network (LAN) card.

Figure 4:
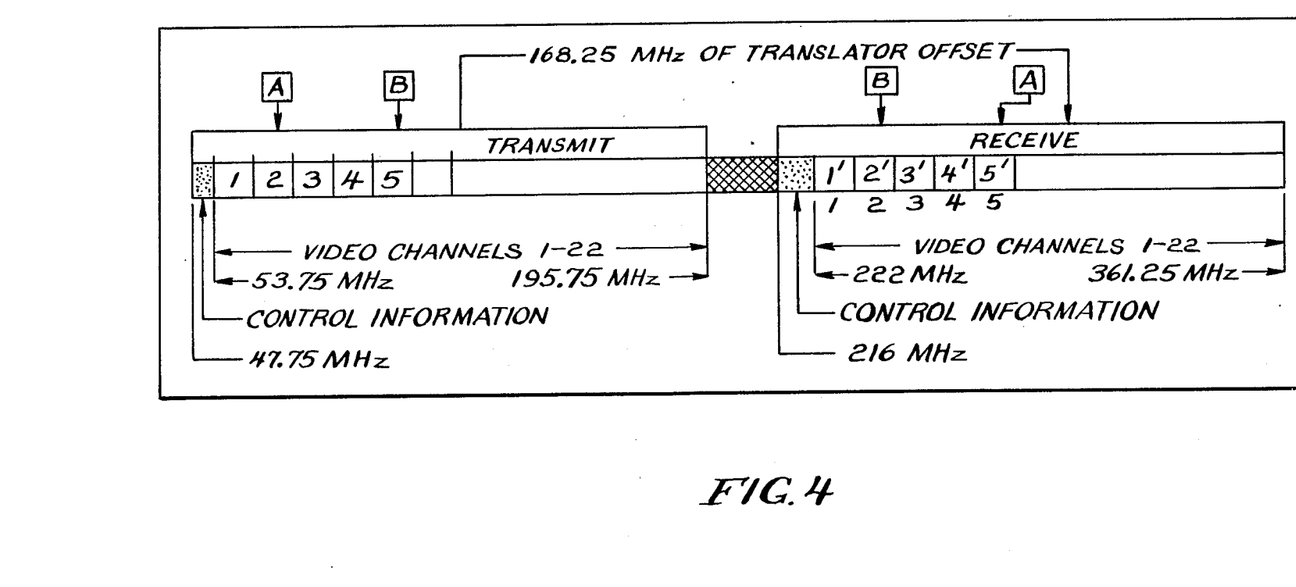
FIG. 4 is a frequency diagram useful in explaining the operation of the frequency translator contained in the CDU.

The operation of the frequency translator 60 may be best understood in conjunction with the diagram of FIG. 4. In FIG. 4, for purposes of illustration only, it is assumed that the frequency translator provides an offset (upshift) of 168.25 Mhz. Pictorially represented are a number of video channels (22 for illustration) between the frequencies, 53.75 Mhz and 195.75 Mhz. Within this frequency range 22 discrete channels are defined for transmission from a work station to the CDU. Similarly, a set of 22 video channels offset by 168.25 Mhz are defined for reception of video information by the work stations from the CDU unit. If, for example, a station designated A wishes to transmit data to station B, the network control computer will arbitrarily assign work station A to what is shown in the FIG. 4 diagram as channel 2 to transmit. Work station B will be assigned, arbitrarily, channel 5 to transmit. Work stations A and B then are assigned channels 5' and 2', respectively, for receiving video data from the other. The transmitted signals are upshifted by the translator 60 for the purpose of allowing amplification and to reduce ghosting. For purposes of exemplification, if A were transmitting to work station B on channel 2 and if channel 2 were 66Mhz, channel B would receive on channel 2' 234.25Mhz.

It will be readily apparent from the foregoing that multiple work stations can send and receive data. Obviously, larger systems can be provided if desired simply by providing additional frequencies for video channels along with the associated control circuitry.

The frequency translator of FIG. 3 is relatively straightforward. A video signal received from a work station via spliters 62 and 64 is provided to a low pass filter 66 under control of the network computer 22. The signal is amplified at 68, mixed at 70 and 72 with appropriate signals having the necessary frequencies to accomplish the selected frequency translation. In the disclosed embodiment two mixers are employed to eliminate unwanted frequency products. For that purpose a band pass filter 74 is interposed between mixer 70 and 72. To maintain stable frequency operation, a PLL circuit 76 is used to control the oscillators in a manner well known in the art. The output of the mixers and band pass filter 74 is amplified at 78 and placed back on the network line via high pass filter 79 and splitters 64 and 62 for transmission to all of the work stations. Of course, only the work station which has been assigned to the upshifted frequency of interest will demodulate the video signal.

If desired, more than one station can be designated to receive the signal whereby conference calls can be accomplished. This is a particularly advantageous feature of the invention when combined with the feature permitting video to follow voice. Thus, for example, several work stations, say 4, can be in a conference mode. The control computer, from the work station information, determines which work station participant is speaking. That work station is designated as the transmitting work station and all of the remaining work stations are receiving stations. The result is that the person at the transmitting station will have his video information, from the video camera 32, transmitted to all of the receiving work stations. Thus, in the video camera mode, the person speaking will appear on the CRTs of the receiving work stations. When the speaker changes to a different work station, the video will follow the voice and the picture of the new speaker will appear on all of the remaining work stations.

The circuitry and software for accomplishing this function is described hereafter in additional detail. It should be here noted, however, that the network control computer 22 uses a signal generated by the speaker phone circuits 40 to determine which work station has video to be transmitted to the remaining work stations participating in the conference.

Figure 5:
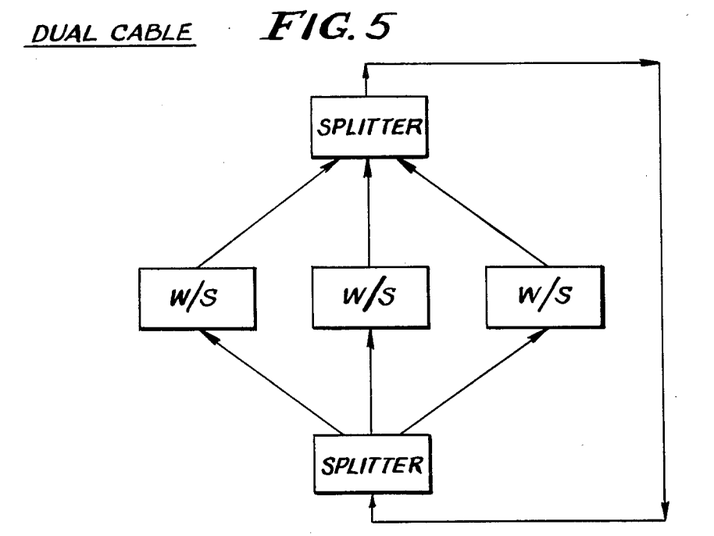
FIG. 5 illustrates an alternate dual cable arrangement which can be employed for interconnecting the work stations of the present invention.

Before turning to the details of the various circuits contained in the work station aux box, we shall first refer to FIG. 5 which illustrates an alternate method of interconnecting the work stations. FIG. 5 does not require the frequency translator 60 or, in fact, a cable distribution unit 24 at all. It is known in the art as a dual cable system and is suitable for local area network installations. Each work station is provided with two cables, one for transmission to other work stations and one for reception from other work stations. Splitters are used as appropriate to interconnect the work station cables. The system, as illustrated, works well for video information but computer data may still require frequency translation. For such a dual cable system, however, commercially available network translators, such as those manufactured by IBM, can be employed to prepare computer data for transmission between work stations in a dual cable system.

Figure 6:
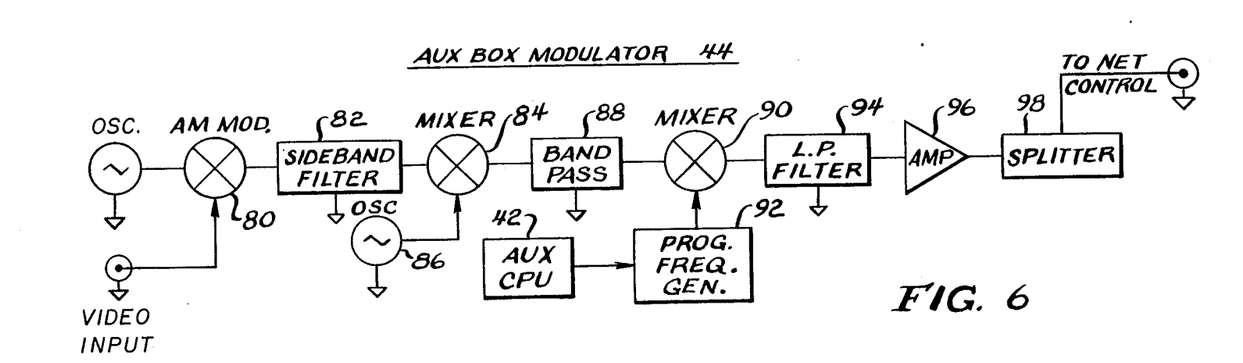
FIG. 6 is a schematic diagram of the modulator contained in the aux box of FIG. 2.

Referring now to FIG. 6, the aux box modulator 44, associated with the video camera 32, is shown in greater detail. The video input from the camera AM modulates a 45.75Mhz oscillator. Obviously the oscillator frequency may be selected as desired. Vestigial side band filter 82 is employed to remove the upper side bands created by the AM modulator. The modulator signal is then upshifted by mixer 84 which combines the modulated signal with an oscillator frequency from oscillator 86. For exemplary purposes the oscillator 86 is shown as having a frequency of 155.25Mhz. Thus, for example, the output of mixer 84 would be a signal having a frequency of 201Mhz (45.75Mhz + 155.25Mhz). The upshifted signal is provided to a band pass filter 88 preferably having a 16Mhz pass band. The signal is then mixed at 90 with a frequency created by a programmable frequency generator 92 under control of the aux box CPU 42. The frequency selected is a function of the particular channel which has been assigned to the work station by the network control computer 22 as explained in connection with FIG. 4. The programmable frequency generator 92 includes a crystal, an array of divide-by circuits, appropriate amplifiers and a voltage controlled oscillator. For greater frequency accuracy a PLL circuit is preferably included. The output of mixer 90 is provided to a low pass filter 94 which rejects harmonics of the mixer output for transmission to the CDU via an amplifier 96 and splitter 98.

The modulator as thus far described is capable of performing the usual AM modulation of video information for transmission over a network. The modulation is at a frequency selected by the network control computer so that various channels can be assigned for sending information by each of the work stations.

Figure 7:
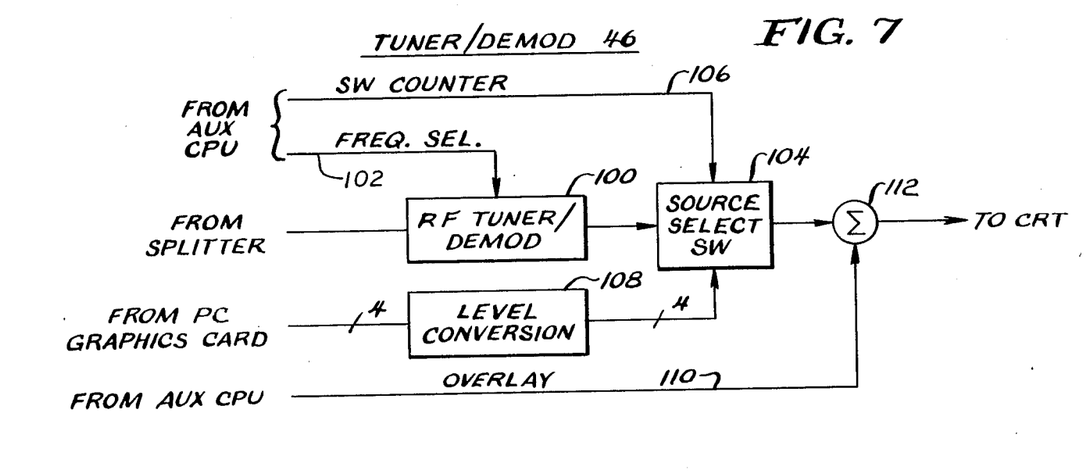
FIG. 7, is a block diagram of the tuner/demodulator contained in the aux box.

Referring to Figure 7, the tuner/demodulator is shown in greater detail. The tuner's purpose is to receive video information from the system (either the local work station or from the network), demodulate it and provide it to the CRT 30 for display. A standard RF tuner/demodulator 100 of a type commercially available is controlled by the aux CPU via lines 102. The aux CPU determines the frequency to be detected by the demodulator as a function of the frequency assigned by the network control computer in establishing the work station conference. The unit also includes a source select switch 104 which permits display on the CRT of video from the demodulator 100 or data from the work station personal computer. The source select switch is controlled by the aux CPU via control lines 106. Thus, the source select switch will provide either the video data from the tuner 100 or from the PC graphics card, via a level conversion circuit 108 to the CRT. The level conversion circuit 108 receives the video input lines from a PC graphics card, such as the IBM CGA or EGA cards. The data specifies the red, green, blue and intensity information for a video display. Typically, these lines have binary voltage levels of zero or five volts. The outputs of the level conversion circuit 108 has a reduced range, typically zero to or one volt. By scaling the RGB signals from the PC graphics card to traditional analog video values, an analog CRT can be used to display them thus obtaining a significant advantage unavailable in the prior art. Specifically, computer graphics and video information can be alternately selected for display on the CRT.

In addition to selecting either video or graphics information for display, the system permits the display of overlays either on the graphics or received video information via line 110 and summing circuit 112.

In sum, the tuner/demodulator 46 is a specialized unit which, under control of the aux CPU, displays video information received from the CDU or computer graphics from the local PC along with any desired overlay information.

Figure 8:
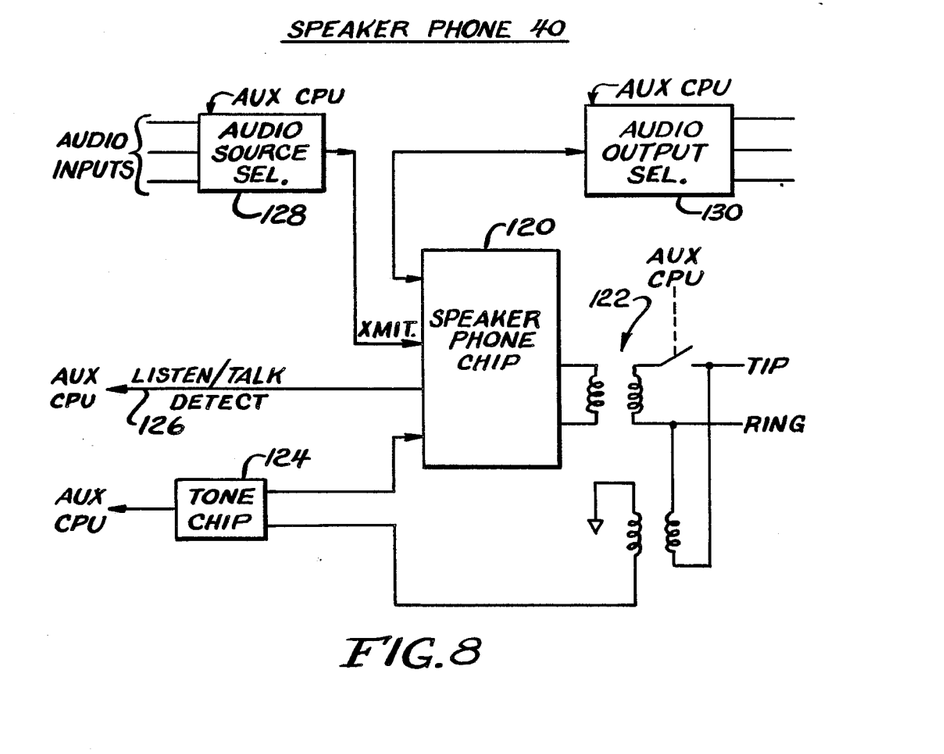
FIG. 8 is a block diagram of the speaker phone circuit contained in the aux box.

FIG. 8 shows the speaker phone circuit 40 in greater detail. The circuit is based upon a commercially available "speaker phone" chip 120, such as a Toshiba TA13008. Such a chip is designed to switch between ingoing and outgoing audio sources based upon signal strength. The chip is connected to the telephone line in a conventional manner as indicated at 122 and has a tone chip 124 associated therewith. The speaker phone chip includes output line 126 which may be considered a talk/listen detect and indicates whether the local audio source is being provided to the phone line or whether a remote source is being received. The audio input to the speaker phone chip 120 is via a source select switch 128 through which a number of audio inputs may be provided. For example, the microphone associated with the video camera 32 is connected through this switch as is any external audio source which may be desired. Selection of which source is provided to the chip is controlled by the aux CPU as indicated. Similarly, the speaker phone chip output is provided to an output select switch 130, again controlled by the aux CPU. The output of the switch 130 may be provided to selected speakers as desired.

In operation a local audio source is selected by the aux CPU and provided to the speaker phone chip for transmission over the phone line as a function of the relative strength of the local signal versus the received signal. The tone chip 124 provides the dialing tones for the work station unless the user prefers to dial the phone number manually at the telephone set. In the latter case the tone chip detects the dialing tones from the phone set and provides the information to the aux CPU so that, in any event, it can monitor the status of a call being placed. Once an audio connection has been established, the line 126 is monitored by the aux CPU and utilized to determine whether the local work station audio is being provided to the network or whether the local work station is listening. This signal is sent to the aux CPU and to the NCC for the video follows voice switching of the CRT display as described previously (and hereafter in connection with the software flow diagrams).

Figure 9:
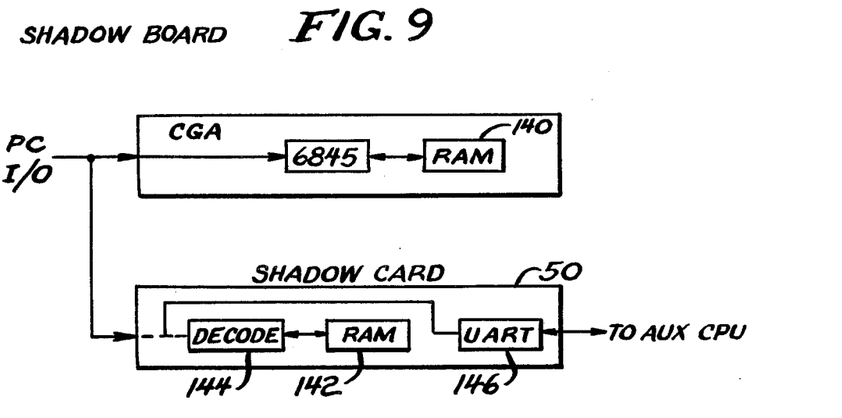
FIG. 9 is a block diagram of the shadow board which is provided for interfacing the personal computer with the aux box CPU.

Referring to FIG. 9, the function of the shadow board 50 is indicated. As shown in FIGS. 2 and 9, the shadow board simply tracks the information stored in the computer graphics card of a typical personal computer, such as the IBM PC and its progeny. This permits the system to obtain certain graphics information needed to transmit computer grahics over the network. Specifically, to transmit graphics it is necessary to send the contents of the display RAM 140. Some of the necessary information, however, such as color, cursor position and resolution options, may not be available from the graphics card (typically the graphics card uses chips, such as a Motorola M6845, which does not permit full interrogation). Therefore, in order to obtain this information, it is necessary to "shadow" the operation of the graphics card and store the information in accessible form. This is the purpose of the shadow card 50 which contains a shadow RAM 142, a decoding chip 144 and a communicating device 146 so that, upon request, the contents of the RAM 142 may be provided to the aux CPU.

From the foregoing description of hardware and the indication of the operational function of each portion hereof, it will be apparent to those skilled in the art how the system operates to provide the advantages indicated. For completeness, however, a brief operating summary will be provided in conjunction with a description of the software routines.

Figure 10A:
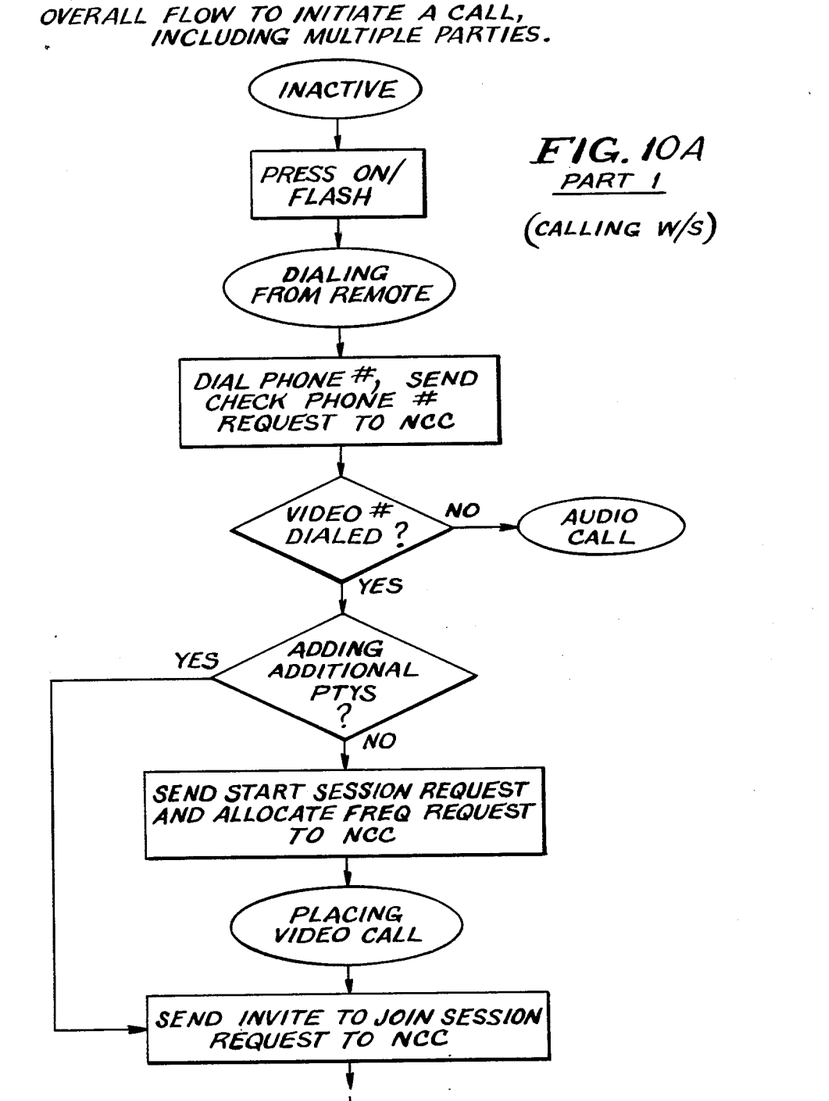
FIGS. 10A parts 1 and 2 through 10F are flow diagrams useful in understanding the programming requirements of the invention.

Referring to FIG. 10A, the flow diagram for initiating a call is illustrated. When the calling work station desires to initiate a call the remote control on button is pressed enabling dialing directly from the remote control unit (alternatively dialing may be accomplished on the telephone and set). After the phone number is dialed, the phone number is sent to the network control computer (NCC) where it is checked to see if it involves a video work station. If not, it is an audio call and proceeds solely through either the telephone hand set or the speaker phone function of the circuit 40 shown in FIG. 8. If a video work station is called, the system first determines if this is the first work station to be called or an additional party.

If it is the first work station, a start session request is sent from the calling work station to the NCC which results in frequency allocation (channel assignment) as described in connection with FIG. 4. The video portion of the call is then placed and an "invite to join" request is sent from the calling work station, through the NCC, to the called work station. If the work station being called is an additional party, the program branches directly to the invite to join routine.

At the called work station the invitation to join signal is received and the call recipient presses the on button on his remote control if he wishes to receive the call. This sends a confirmation tone which is received by the calling station and, in return, advises the called station that it is ready to begin a video call. After "hand shaking" to insure that both stations are ready, the called station requests the allocation of frequencies (or channels) from the NCC, again as illustrated and described in connection with FIG. 4. Thus, at this point in time, the NCC has allocated both a transmit channel and a receive channel for each work station and provides the necessary translator offset between the two so that the calling station transmits at one frequency and the called station receives at an upshifted frequency. For two way communications between two work stations there are actually four channels involved, each work station having a transmission channel and a receiving channel.

When the frequencies have been allocated by the NCC the called work station sends a request to join signal which results in connection of the video call. As will be apparent, the called work station portion of the flow diagram is repeated for each additional party requested to join the conference.

Figure 10B:
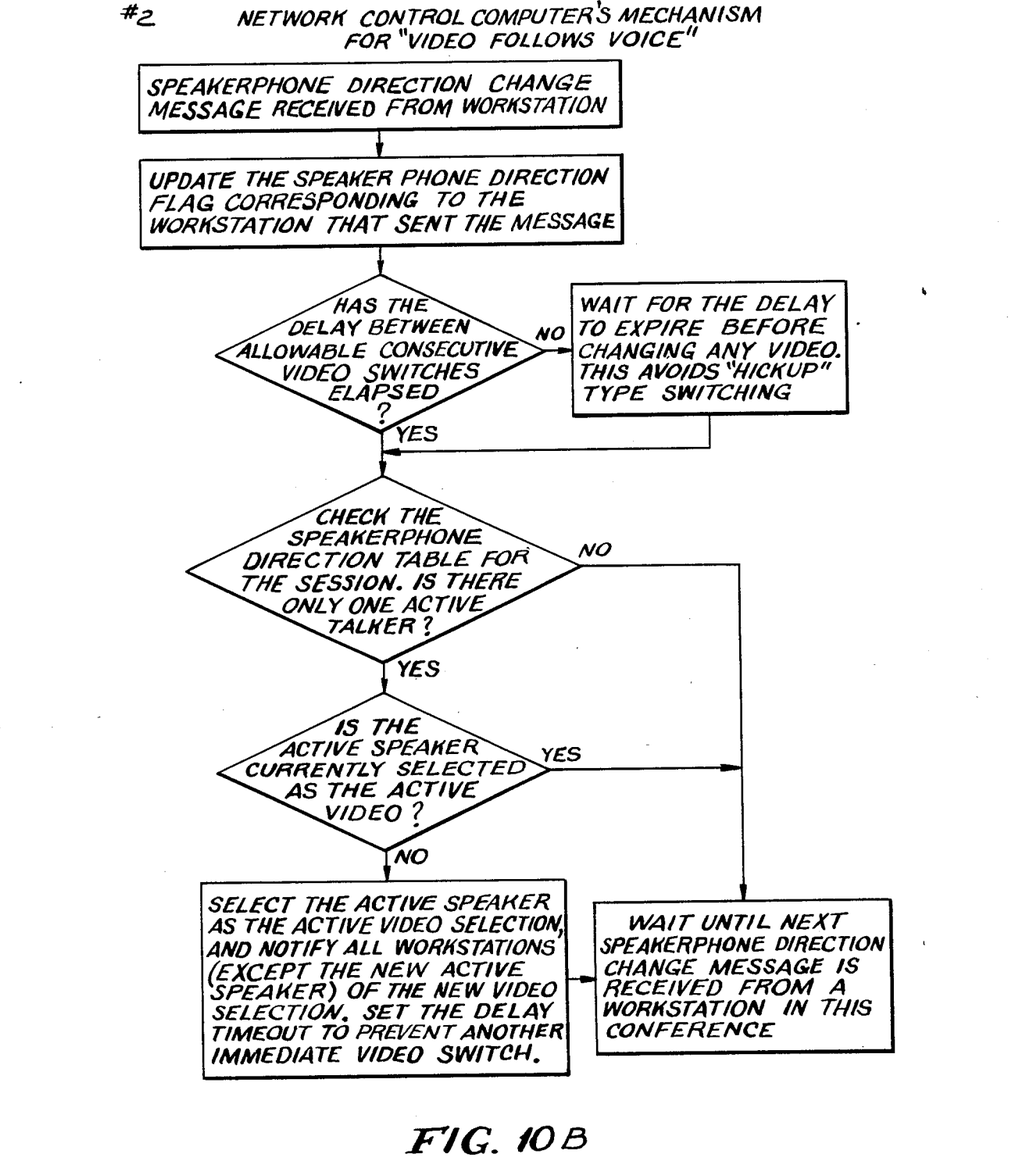

Referring now to FIG. 10B, the flow diagram for the NCC "video-follows-voice" function is illustrated. When the work stations involved in a conference notify the NCC that there has been a change in which work station is speaking, the NCC updates its information, checks to see if there has been sufficient delay since the last change so as to avoid "hiccup" switching. Next the NCC looks to see if there is more than one active speaker, i.e., efforts on the part of more than one work station to become the speaker. If this confused situation obtains, no switching is permitted. In effect the system waits until matters settle down and only one person is speaking.

If only one person is speaking and that person is different from the previous speaker, the NCC identifies the new speaker's video channel and notifies all the work stations to receive that channel instead of the previous channel. In this manner each time that the speaker in a multiple work station conference changes, all of the work stations can switch to the video signal of the work station which is currently speaking. In this manner all conference participants can see the person who is speaking and, as the speaker changes, so does the video picture displayed on the screen of the conference participants.

Figure 10C:
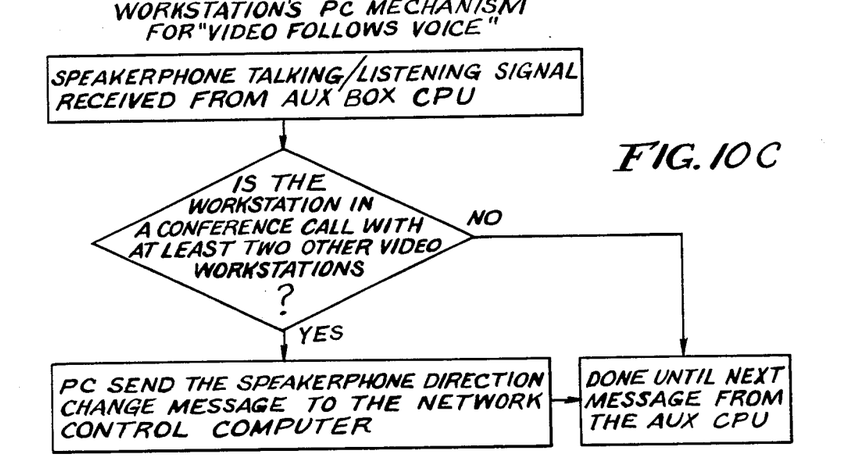

The function of the local work station in video-follows-voice is shown in FIG. 10C. The work station PC receives the speaker phone talking/listening signal from the aux box CPU. It determines if the work station is in a conference call with at least two other work stations. If so, it sends the speaker phone direction change message to the NCC for the purposes described in connection with FIG. 10B.

Figure 10D:
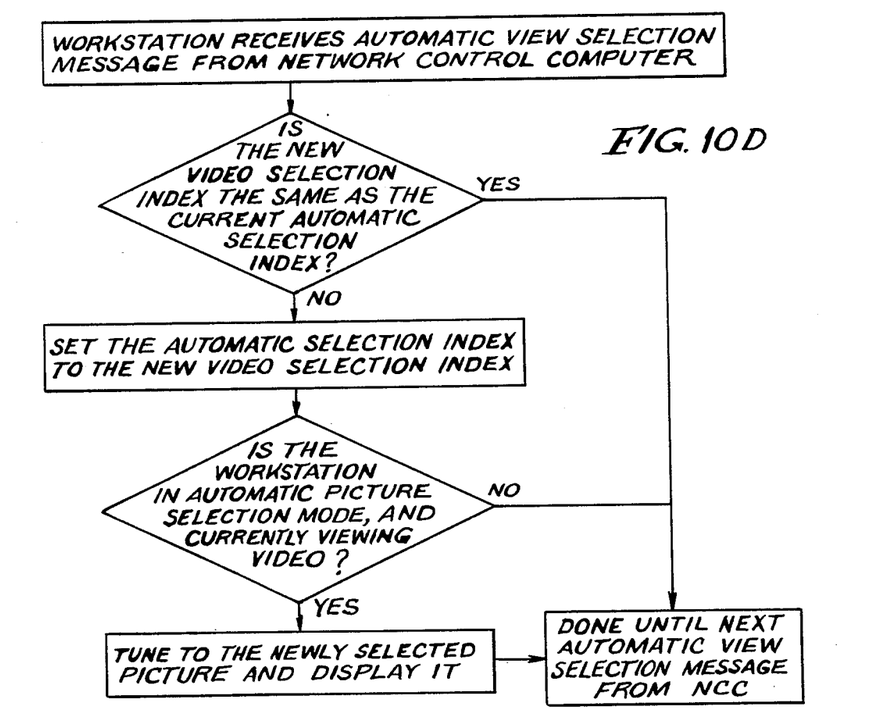

FIG. 10D shows the action which the work station takes upon receiving a change signal from the network control computer. Essentially when a new video selection signal is received, the work station checks to determine if it is in the automatic picture selection mode. If it is, the new picture is displayed on the CRT. On the contrary, if the work station is in the computer mode where remote video is not being displayed, then the new video channel is not displayed.

Figure 10E:
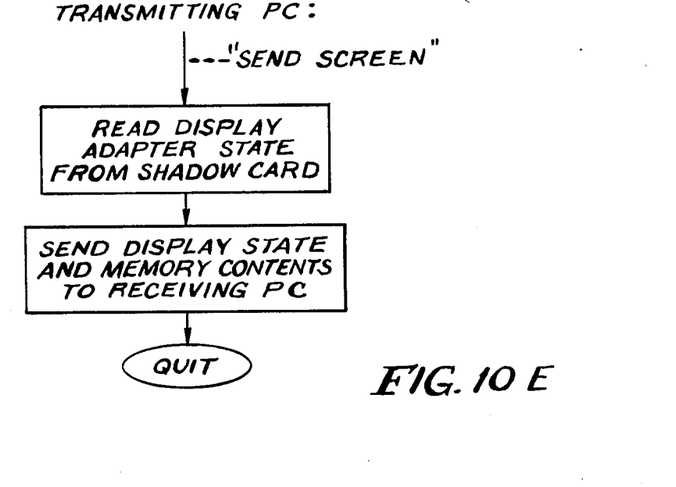

Referring to FIG. 10E, the shadow board operation is indicated. It will be recalled that the shadow board monitors the data and address lines of the IBM PC to detect communication with the graphics card. Because much of the display data cannot be read back from the card, the shadow board monitors and stores this information. When a work station desires to transmit computer or graphic information, a "send screen" command is given. This causes the PC to read the graphics card data from the memory of the shadow card and send this information to the PC at the remote work station. In this way an important object of the invention is obtained, namely, the ability to transmit computer graphics simultaneously with live video and audio information.

Figure 10F:
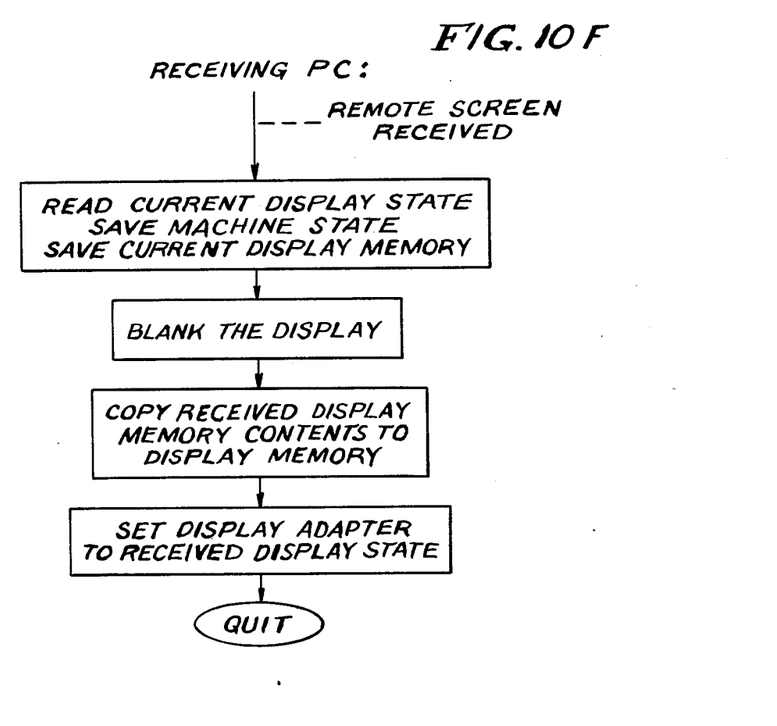

At the receiving work station (FIG. 10F) the PC (1) reads the display information for the transmitted video data, (2) saves the current machine state and display memory, (3) blanks and then displays the received display memory contents by copying it into its own display memory. The receiving station's graphics card is set by the information from the shadow card to properly display the received data.

While we have shown and described embodiments of the invention, it will be understood that this description and illustrations are offered merely by way of example, and that the invention is to be limited in scope only as to the appended claims.

What is claimed is:

1. A communication system for permitting simultaneous voice and video communication between two or more parties comprising:
 (i) a work station for each party, said work station including:
   (a) audio means for providing audio communications via an audio transmission path,
   (b) video means for providing video communications via a video transmission path,
   (c) computer means for initiating and supporting audio and video communications over said transmission paths,
   (d) means for interfacing the video and audio means with said transmission paths responsive to said computer means;
 (ii) network control means in said video transmission path for coordinating video communications among work stations including means for dynamically assigning transmit and receive frequencies for each participating work station and for dynamically reassigning receive frequencies during communication to achieve a video-follows-voice mode.

2. A communication system according to claim 1 wherein said audio means includes:
 a speaker phone circuit connecting said work station to said audio transmission path, said circuit having means for indicating whether its associated work station is sending or receiving audio whereby video transmissions may be coordinated with audio transmissions.

3. The communication system according to claim 2 wherein each work station transmits the status of its speaker phone circuit indicating means to said network control means, the latter including means for identifying which work station in the system is transmitting audio and notifying all nontransmitting work stations of the transmit frequency of the transmitting work station whereby each time there is a change in the source of the audio transmission a corresponding change is provided for in the video transmission to achieve a video-follows-voice mode.

4. The communication system according to claim 1 wherein said video means includes:
 (a) a CRT for displaying video information;
 (b) means for receiving information from said video transmission path and said computer means and converting it to video information suitable for display on said CRT.

5. The communication system according to claim 4 wherein said video means further includes:
 (a) a video camera;
 (b) modulating means for producing an RF signal at a frequency assigned by said network control means for transmission of the camera output via the video transmission path.

6. The communication system according to claim 4 wherein said CRT is an analog RGB device and said means for receiving information includes:
 (a) an RF tuner/demodulator controlled by said interfacing means for demodulating information of a selected frequency received from the video transmission path;
 (b) a level converter for converting the signal levels of graphics data from said work station computer means to also permit the display on said CRT.

7. The communication system according to claim 6 wherein said means for receiving information further includes:

(a) a source switch controlled by said interfacing means to permit selective viewing of either graphics data or information received from the video transmission path;
(b) means for providing text overlay from the computer means on the CRT.

8. The communication system according to claim 1 wherein said computer means is programmed to communicate with said network control means and also to provide computational services when not communicating, said computer means including:
(a) a graphics circuit for displaying computer generated graphics on a CRT;
(b) means for monitoring the state of said graphics circuit and, on request, communicating said state to the interfacing means whereby a first computer means can send graphics data over the video transmission path along with the required state of its graphics circuit to permit a second computer means to properly display the graphics information on a CRT.

9. The communication system according to claim 8 wherein the graphic circuit state information is transmitted to said interfacing means via a communication device included in said monitoring means, said information including: cursor position, resolution option, and color information.

10. The communication system according to claim 1 wherein said means for interfacing further includes remote control means for operating the work station via a wireless remote control input device.

11. A communication system for permitting simultaneous voice and video communication between two or more parties comprising:
(i) a work station for each party, said work station including:
(a) audio means for providing audio communications via an audio transmission path,
(b) video means for providing video communications via a video transmission path,
(c) computer means for initiating and supporting audio and video communications over said transmission paths,
(d) means for interfacing the video and audio means with said transmission paths responsive to said computer means;
(ii) network control means in said video transmission path for coordinating video communications among work stations including means for dynamically assigning transmit and receive frequencies for each participating station including:
(a) a cable distribution unit for interconnecting the work stations in said video transmission path;
a network control computer, also interconnected to the video transmission path, for communicating with the work station computer means and for controlling said means for dynamically assigning transmit and receive frequencies.

12. A communication system for permitting simultaneous voice and video communication between two or more parties comprising:
(i) a work station for each party, said work station including:
(a) audio means for providing audio communications via an audio transmission path,
(b) video means for providing video communications via a video transmission path,
(c) computer means for initiating and supporting audio and video communications over said transmission paths,
(d) means for interfacing the video and audio means with said transmission paths responsive to said computer means;
(ii) network control means in said video transmission path for coordinating video communications among work stations including means for dynamically assigning transmit and receive frequencies for each participating work station, said means for dynamically assigning transmit and receive frequencies includes a frequency translator for shifting the transmitting frequencies by a selected offset to create receiving frequencies.

13. The communication system according to claim 11 wherein said means for dynamically assigning transmit and receive frequencies includes a frequency translator for shifting the transmitting frequencies by a selected offset to create receiving frequencies.

* * * * *